United States Patent
Mathisen et al.

[11] Patent Number: 6,145,381
[45] Date of Patent: Nov. 14, 2000

[54] REAL-TIME ADAPTIVE CONTROL OF ROTATIONALLY-INDUCED VIBRATION

[75] Inventors: Eric C. Mathisen, Westfield, N.J.; Robert L. Grogan, Pasadena, Calif.

[73] Assignee: AlliedSignal Inc., Morristown, N.J.

[21] Appl. No.: 09/190,677

[22] Filed: Nov. 12, 1998

[51] Int. Cl.[7] .................................................. G01H 1/00
[52] U.S. Cl. .............................. 73/660; 73/659; 381/71.1
[58] Field of Search ........................... 73/659, 660, 593; 702/190, 191, 194, 189; 381/71.1, 71.2, 71.8, 71.13, 71.14, 94.1, 94.9

[56] References Cited

U.S. PATENT DOCUMENTS

| | | | |
|---|---|---|---|
| 4,989,159 | 1/1991 | Liszka et al. | 73/660 |
| 5,329,416 | 7/1994 | Ushiyama et al. | 361/146 |
| 5,418,857 | 5/1995 | Eatwell | 381/71 |
| 5,469,087 | 11/1995 | Eatwell | 327/140 |
| 5,501,105 | 3/1996 | Hernandez et al. | 73/660 |
| 5,619,581 | 4/1997 | Ferguson et al. | 381/71 |
| 5,784,272 | 7/1998 | Schootstra et al. | 364/158 |
| 5,789,658 | 8/1998 | Henn et al. | 73/1.37 |
| 5,812,682 | 9/1998 | Ross et al. | 381/71.11 |

OTHER PUBLICATIONS

Beale et al., "Magnetic Bearing Control Systems and Adaptive Forced Balancing," IEEE Control Systems, 0272–1708/94, Apr. 1994, pp. 4–12.

*Primary Examiner*—Hezron Williams
*Assistant Examiner*—Helen C. Kwok
*Attorney, Agent, or Firm*—Loria B. Yeadon

[57] ABSTRACT

Disturbances of a periodic nature, such as those occurring in a rotating device can be attenuated by a cancellation function. A cancellation signal is produced by extracting one or more frequency components (harmonics) from a disturbance. A set of weighting coefficients are generated by an artificial neural network based on information derived from the selected frequency components of the periodic disturbance signal. The artificial neural network algorithm adapts in real time to shifts in the magnitude and phase of the disturbance frequencies selected for attenuation at the sensor location. In turn, these coefficients are applied to a function of a similar number of components and applied to the rotating device. Over a period of time, feedback and adaptation will attenuate the disturbance at the selected frequencies.

9 Claims, 2 Drawing Sheets

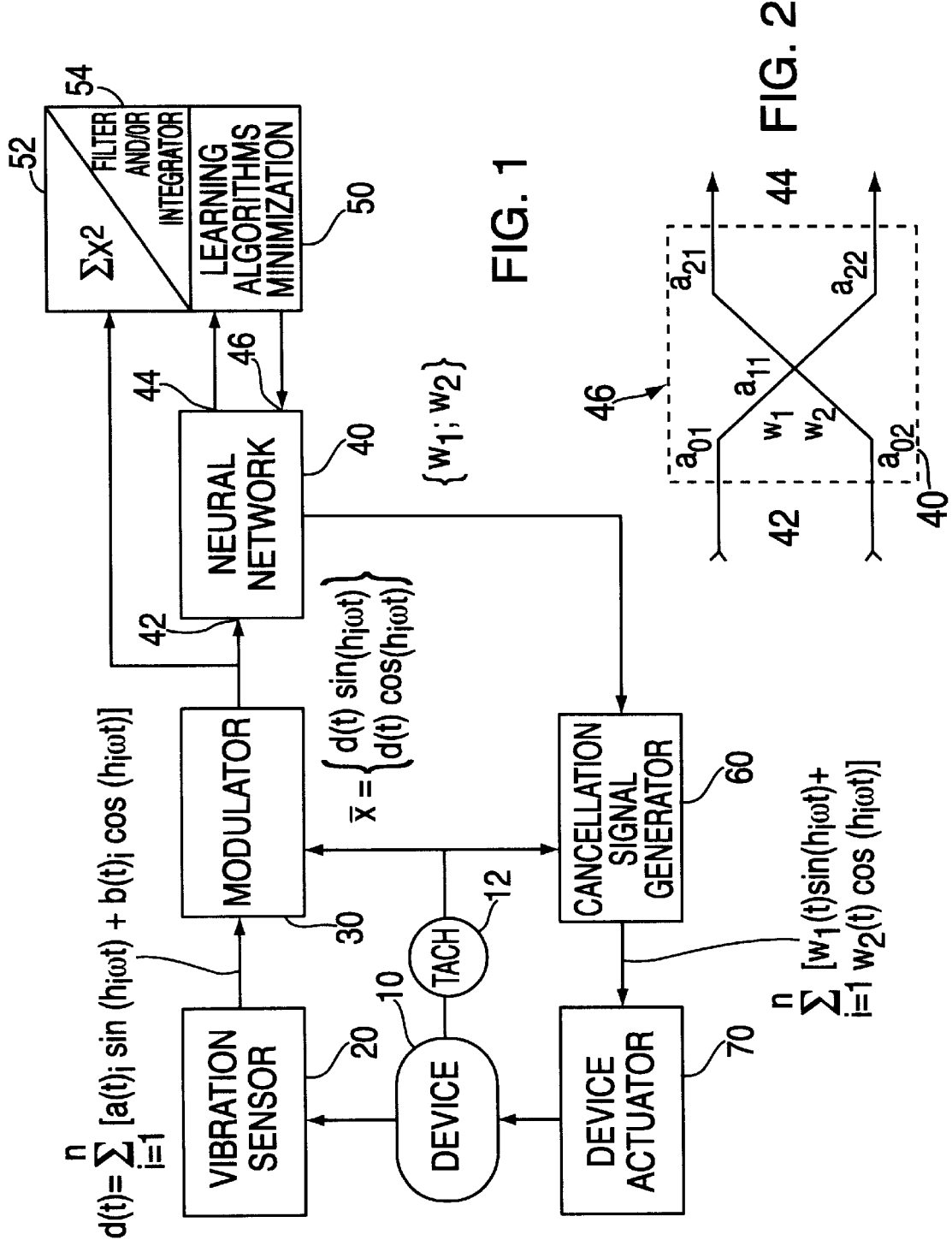

REAL-TIME ADAPTIVE CONTROL OF ROTATIONALLY-INDUCED VIBRATION

BACKGROUND OF THE INVENTION

Rotating shafts usually contain imperfections that cause vibrations as they turn. As explained below, such vibrations can be represented as a periodic mathematical function. For every such function, there is a corresponding periodic function that will nullify the effects of the vibration. If the corresponding function, or a near approximation thereof, could be converted to a physical force and applied to the rotating shaft, perhaps through a magnetic bearing or another suitable device, then the vibrations could be attenuated within the resolution limits of the apparatus.

DESCRIPTION OF DRAWINGS

FIG. 1 is a block schematic diagram of a system for attenuating a periodic disturbance function;

FIG. 2 is a schematic diagram of an artificial neural network that may be utilized with the system of FIG. 1.

DESCRIPTION OF THE INVENTION

Figure 3:
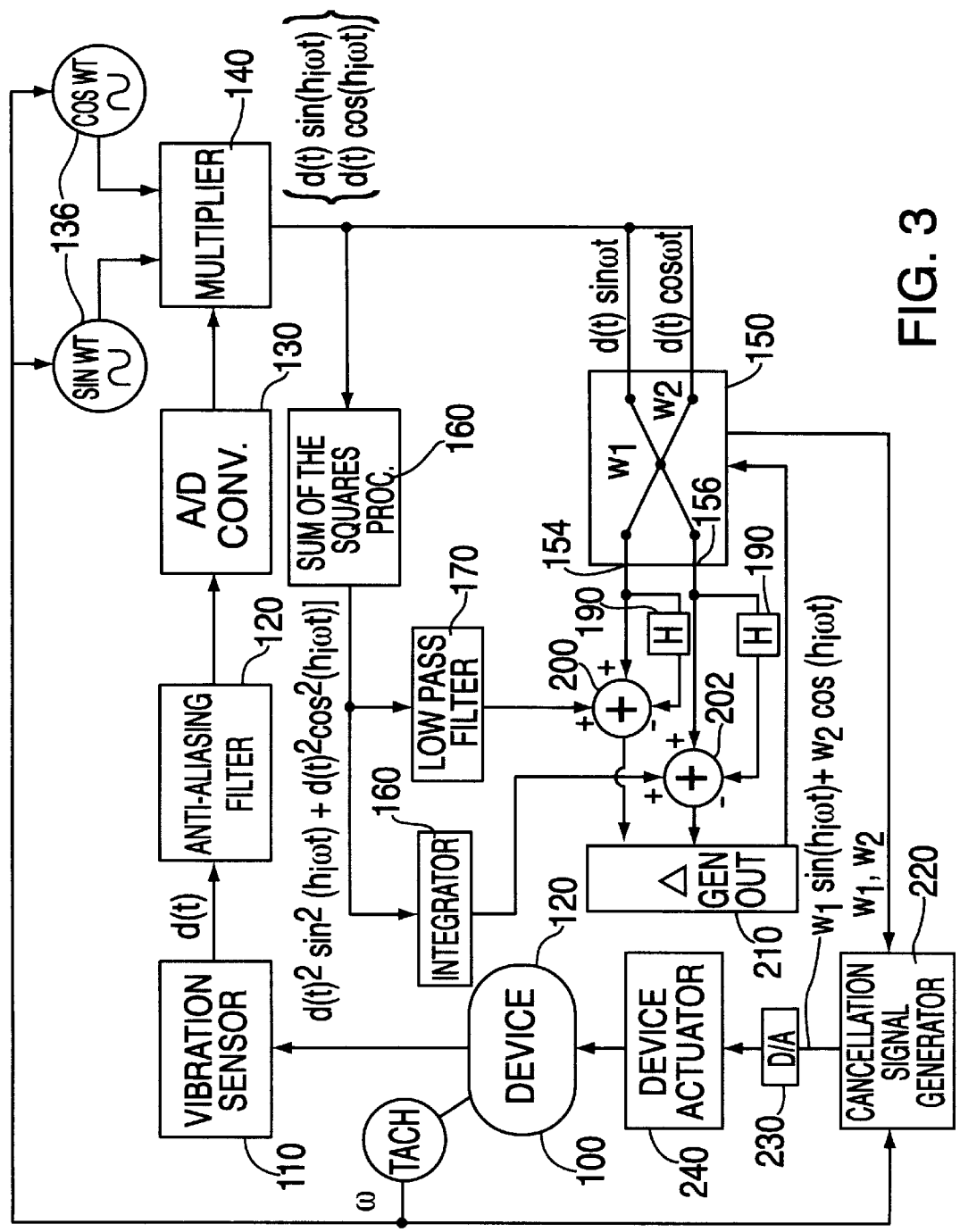
FIG. 3 is a detailed block schematic diagram of a system for attenuating a periodic disturbance function.

Disturbances of a periodic nature in a rotating device can be minimized or attenuated by inducing a cancellation function in the device. The disturbance can be represented as a Fourier series d(t) of periodic functions and coefficients:

$$d(t) = \sum_{i}^{n} [a(t)_i \sin(h_i T t) = b(t)_i \cos(h_i T t)] \quad [1]$$

where:

a(t)$_i$ and b(t)$_i$ are coefficients;

n is the total number of harmonics to attenuate;

h is the harmonic multiplier;

i is the series counter; and

T is the rotational rate of the shaft.

A device 10, represented by the indicated element in FIG. 1, generates a disturbance in this form. It should be understood that the coefficients and harmonic multiplier (a(t)$_i$, b(t)$_i$, and h$_i$) in this function are not limited to integers, but may also represent fractional values. A vibration sensor 20 senses this disturbance and converts it into an electrical signal. Suitable sensors such as piezoelectric devices are commercially available. A means for measuring the rate of rotation $\omega$, such as a high-resolution tachometer 12, is coupled to the rotating device 10. The output of the tachometer 12 is provided to the stages requiring the value of $\omega$.

The disturbance function detected by the vibration sensor 20 is modulated by the frequency components at which attenuation is desired, e.g., the fundamental (i.e., $\omega$), 2$\omega$), and/or 3$\omega$), etc. in sine-cosine pairs in a modulator 30. After the modulation is applied, the components corresponding to the modulation frequencies will be most prominent. For simplicity of discussion and illustration, only the fundamental frequency (h$_i$=1) will be considered here, and thus the function then becomes:

$$d(t) = a(t)\sin(\omega t) + b(t)\cos(\omega t) \quad [2]$$

but other frequencies could have been included. Thus, the disturbance signal is modulated with sin $\omega$t and cos $\omega$t, yielding the vector:

$$\{d(t)\sin(\omega t); d(t)\cos(\omega t)\} \quad [3]$$

An artificial neural network 40 uses the output of the modulator as the input signals supplied to its input neurons 42. In the case where only the fundamental is considered, the network will have two input neurons; where other components are used, the network will have additional input neuron pairs for each harmonic component. If sine-cosine pairs are utilized, as here, then the network will have two input neurons for each frequency.

As shown in greater detail in FIG. 2, the network 40 also has two input neutrons $a_{01}$ and $a_{02}$, a single hidden neuron $a_{11}$, and two output neurons $a_{21}$ and $a_{22}$. The connections from the input neurons to the hidden neuron constitute a weight layer with weights $w_1$ and $w_2$. The weights in the network 40 are adjusted by a learning algorithm 50. An algorithm employing back propagation will work satisfactorily, although other learning methods could be employed.

The outputs 44 of the network 40 are provided to the learning algorithm 50. The sum of the squares of the modulated components d(t) sin $\omega$t and d(t) cos $\omega$t are generated 52 and then provided as filtered and optionally integrated components 54 to the learning algorithm 50. The learning algorithm 50 compares successive values of the outputs 44 of the network 40 with the filtered and integrated components 54 and then generates a delta value used to adjust the value of the weights $w_1$ and $w_2$.

The learning or adaptation process of the artificial neural network 40 is facilitated by the correlation between the modulated neural network input data and the filtered component of the squared sum of the modulated disturbance signal concatenated with the temporal phase information contained in the incremental change of the network output. The weights of the artificial neural network 40 are updated at a slow cycle processing rate with the goal of attenuating the filtered component of the modulated sensor data proportionally to the rotation rate of the device. By contrast, the generation and signal processing of the modulated components (d(t) sin (h$_i$ $\omega$t) and d(t) cos (h$_i$ $\omega$t)) (20, 30, 52, 54, 60) occurs at the "fast" cycle processing rate.

The weights $w_1$ and $w_2$ are now used as coefficients for a cancellation signal. A cancellation signal generator 60 applies the weights $w_1$ and $w_2$ to the frequency components of interest, namely, sin $\omega$t and cos $\omega$t, yielding:

$$s(t)=w(t)_1\sin \omega t+w(t)_2 \cos \omega t \quad [4]$$

This signal is applied to a device actuator 70, which converts the signal through a transducer to a physical disturbance applied to the device 10. The vibration sensor 20 and the device actuator 70 need not be at the same position on the shaft as the attenuation will occur at the sensor 20.

As the artificial neural network 40 learns, the disturbance at the frequencies of interest is attenuated until it reaches the resolution (or quantization) limits of the vibration sensor 20 and the device actuator 70. In a digital realization of the system, A/D (analog-to-digital) and D/A (digital-to-analog) converters could be utilized and their performance would also affect the degree of resolution that can be achieved.

A more detailed representation of the system is shown in FIG. 3. A device 100 produces a disturbance in the form of equation 1 above and a tachometer 104 measures the shaft rotational rate $\omega$. The disturbance is sensed by a vibration sensor 110 that provides an analog electrical signal that passes through a filter 120 and converted to a digital format by an A/D converter 130.

The digital signal is then modulated by the output of one or more sine-cosine pair waveform generators 136 in a multiplier 140 operating in the digital domain. Again, for simplicity of illustration, seeking to attenuate the disturbance only at the fundamental frequency, the dominant products are then:

$$\{d(t)\sin(\omega t); d(t)\cos(\omega t)\} \quad [5]$$

The two components, d(t) sin (ωt) and d(t) cos (ωt), are provided as inputs to an artificial neural network 150. Additionally, these components are squared and summed by a processor 160. The output of the processor 160 is filtered by a low-pass filter 170 to produce one value and optionally integrated in an integrator 180 to produce a second value.

Each time the weights of the artificial neural network 150 are updated, the network 150 will produce updated outputs. A unit sample hold module 190 at each output will retain the output value for the preceding time step. Successive iterations of the network output are then provided to respective summing nodes 200, 202 and the difference is calculated. One of the difference values is summed at the node 200 with the filtered value of the sum of the squares (170) and that sum is provided to a learning algorithm module 210. The other output 156 is also provided to the learning algorithm module 210. Using back propagation or some other suitable method, the learning algorithm module 210 generates a delta weight update value for the artificial neural network 150 as an adjustment of the weights.

Optionally, the integrated sum of the squares (180) can be summed (202) with the other of the difference values and then can be supplied to the learning algorithm module 210. The system reaches a solution more quickly when the integrated value is provided to the learning algorithm module 210.

Concurrently with the training of the artificial neural network, the weights are extracted and provided to a cancellation signal generator 220, which provides a drive signal through a D/A converter 230 to a device actuator 240. The actuator 240 generates a physical force that is applied to device 100, completing the loop.

After a sufficient number of iterations, the weights will reach a steady-state value at which point the vector {d(t) sin (ωt); d(t) cos (ωt)} is attenuated to the resolution or quantization limits of the vibration sensor 110 and the device actuator 240 (and any related components) and the weights cease to update. Any perturbation in amplitude or phase of the disturbance at the frequency of modulation will result in the real-time adaptation of the weights by a proportional amount until a new steady state is reached.

The A/D converter 130 is positioned just after the vibration sensor 110 and the anti-aliasing filter 120 while the D/A converter 230 is located just ahead of the device actuator 240. If desired more or less of the system could be implemented in the analog domain and the converters would be located (or eliminated) accordingly.

The multiplier 140, the sum of the squares 160, and related components are selected to handle signals at the "fast cycle rate." In order to satisfy the Nyquist criteria, the fast cycle rate is chosen to be at least twice the highest frequency of interest. Thus, if the operating frequency is ω, 2ω, or 3ω, or some non-whole number multiple thereof, then the fast cycle rate will be at least 2ω, 4ω, or 6ω, etc. Conversely, the artificial neural network 150, the learning algorithm module 210, and related components can be operated at a much lower "slow cycle rate." The slow cycle rate is determined by the drift rate of the disturbance function and the desired rate of artificial neural network adaptation. The ratio of the fast and slow cycle rates can be approximately 1000:1 although other ratios can be employed with satisfactory results.

The system is immune to disturbance at frequencies other than those selected for attenuation. Thus, the design has a negligible effect on response or stability of control laws, effectively forming a real time adaptive notch filter at the frequencies selected for attenuation. It should be recognized that the method can be used to attenuate selected elements of any periodic function.

What is claimed is:

1. An apparatus for attenuating periodic vibration in a rotating device, where the periodic vibration comprises a series of time-variable coefficients and functions, said apparatus comprising means for detecting the periodic vibration in the rotating device;

means responsive to said means for detecting for extracting one or more of the time-variable coefficients and functions from the periodic vibration;

an artificial neural network having input neurons, output neurons and a hidden neuron, the connections from the input neurons to the hidden neuron constituting a weight layer having weights, said input neurons being connected to said means for extracting;

means providing a learning algorithm and responsive to said means for extracting for adapting in real time to adjust the weights in said artificial neural network;

means responsive to the weights in said artificial neural network for generating a cancellation signal; and means responsive to said cancellation signal for imparting a force to the rotating device.

2. An apparatus as set forth in claim 1, where the means for extracting comprises means for extracting one or more harmonics of the periodic vibration.

3. An apparatus as set forth in claim 1, where the means for adjusting the weights in said artificial neural network comprises means, responsive to the means for extracting, for generating the sum of the squares.

4. An apparatus as set forth in claim 3, where the means for adjusting the weights in said artificial neural network further comprises means, responsive to the means for generating the sum of the squares, for filtering and, optionally, integrating.

5. A method for attenuating periodic vibration in a rotating device, where the periodic vibration comprises a series of time-variable coefficients and functions, said method comprising the steps of:

detecting the periodic vibration in the rotating device;

in response to said detecting, extracting one or more of the time-variable coefficients and functions from the periodic vibration;

in response to said extracting one or more of the time-variable coefficients and functions from the periodic vibration, training an artificial neural network comprising input neurons, output neurons, and a hidden neuron, the connections from the input neurons to the hidden neuron constituting a weight layer having weights and said training comprising adjusting the values of the weights in real time;

generating a cancellation signal using the adjusted weights; and in response to said generating a cancellation signal, imparting a force to the rotating device.

6. A method as set forth in claim 5, where the step of extracting comprises the step of extracting one or more harmonics of the periodic vibration.

7. A method as set forth in claim 6, where the step of adjusting the weights comprises the step of generating the sum of the squares.

8. A method as set forth in claim 7, where the step of adjusting the weights futher comprises the steps of filtering and, optionally, integrating.

9. A method of attenuating a periodic disturbance in a rotating device, comprising the steps of:

sensing the periodic disturbance;

extracting selected components of the periodic disturbance;

applying the selected components to an artificial neural network to generate a set of weighting coefficients;

generating a function corresponding to the selected components and employing the weighting coefficients in the function;

applying the function to the device through a transducer; and adapting the weighting coefficients in response to changes sensed over time in the periodic disturbance.

* * * * *